United States Patent [19]

Pelchat

[11] 4,041,301
[45] Aug. 9, 1977

[54] KEY ILLUMINATING DOOR HANDLE

[75] Inventor: Paul F. Pelchat, Plymouth, Mich.

[73] Assignee: General Motors Corporation, Detroit, Mich.

[21] Appl. No.: 670,056

[22] Filed: Mar. 24, 1976

[51] Int. Cl.² .......................................... E05B 17/10
[52] U.S. Cl. .............................. 240/2.13; 240/1 LP; 315/84
[58] Field of Search .................. 240/2.13, 1 LP, 8.2; 350/96 R; 315/84

[56] References Cited

U.S. PATENT DOCUMENTS

| 1,841,570 | 1/1932 | Burkholder | 240/2.13 |
| 3,214,214 | 10/1965 | Marchant | 240/2.13 X |
| 3,388,244 | 6/1968 | Castoe | 240/2.13 |
| 3,908,149 | 9/1975 | Gergoe et al. | 315/84 |

Primary Examiner—Richard L. Moses
Attorney, Agent, or Firm—Charles E. Leahy

[57] ABSTRACT

A key cylinder illuminating device for a lift bar door handle assembly which overlies a recess in the outer panel of a vehicle door. A lift bar is pivotally mounted for movement between a first position overlying the recess and a second position away from the recess wherein a door latch is operated to unlatched position. The door latch also has a lock which prevents the door latch from being operated to the unlatched position even though the lift bar is lifted. A key cylinder is located on the door panel generally beneath the lift bar door handle assembly and receives a key by which the door latch can be unlocked. A light source is mounted on the vehicle door panel within the recess so that it is concealed from view and protected from damage by the lift bar when the lift bar is in its normal first position. A switch is provided on the lift bar door handle assembly and is closed when the lift bar is pivoted to the second position so that an electrical circuit is completed to energize the light source. A reflective surface is provided on the undersurface of the lift bar for reflecting light from the light source onto the key cylinder when the lift bar is pivoted to its second position for operating the door latch.

3 Claims, 9 Drawing Figures

KEY ILLUMINATING DOOR HANDLE

The invention relates to a lift bar door handle assembly for a motor vehicle and more particularly a lift bar door handle having reflective means on the undersurface for directing light from a door mounted light source onto a door lock key cylinder.

It is known in the prior art to provide a light source in the push button of a push button door handle assembly to illuminate a door lock key cylinder. It is also known in the prior art to provide a light source in a housing on the exterior of the door for directing illumination onto the door lock key cylinder.

It is also known to energize the light source by means of a switch which is closed when the push button is manually depressed.

A disadvantage of mounting the light source in a housing on the exterior of the door is that such a light source is susceptible to damage and vandalism and also presents a styling and appearance problem.

The prior art teachings of mounting the light source in the push button of a door assembly is not applicable to a lift bar door handle assembly because the lift bar has a long and slender configuration which renders it incapable of housing a light source.

The present invention provides a key cylinder illuminating device for a lift bar door handle assembly. A conventional vehicle door has a recess in the outer panel thereof with a lift bar pivoted to the door and overlying the recess in the panel. The lift bar is pivotally movable between a first position overlying the recess and a second position away from the recess wherein a door latch is operated to unlatched position. The door latch also has a lock which prevents the door latch from being operated to the unlatched position even though the lift bar is lifted. A key cylinder is located on the door panel generally beneath the lift bar door handle assembly and receives a key by which the door latch can be unlocked. According to the invention, a light source is mounted on the vehicle door panel within the recess so that it is concealed from view and protected from damage by the lift bar when the lift bar is in its normal first position. A switch is provided on the lift bar door handle assembly and is closed when the lift bar is pivoted to the second position so that an electrical circuit is completed to energize the light source. A reflective surface is provided on the undersurface of the lift bar for reflecting light from the light source onto the key cylinder when the lift bar is pivoted to its second position for operating the door latch.

One feature of the invention is that the light source is offered the protection of being mounted in a recess in the door panel and being overlaid by the lift bar.

Another feature of the invenion is that a lift bar door handle is provided with a reflective undersurface for reflecting light from a door panel mounted light source onto the key cylinder.

These and other objects, features and advantages of the invention will become apparent upon consideration of the specification and the appended drawings in which.

Figure 1:
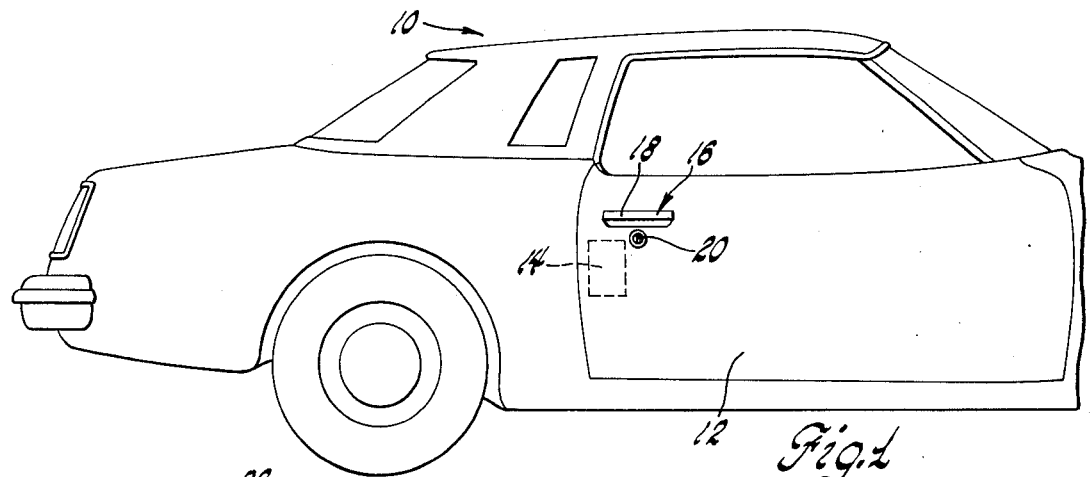
FIG. 1 is a side view of a vehicle body having a lift bar door handle for illuminating a key cylinder.

Referring to FIG. 1, a vehicle body 10 has a conventional door 12 which has its forward end pivoted to the vehicle body for conventional swinging movement about a generally vertical axis between open and closed positions. A conventional door latch 14 is shown by hidden lines and latches, the door 12 in closed position in the usual manner. A lift bar door handle assembly, generally indicated at 16, includes a handle or lift bar 18 which can be manually lifted to unlatch the door latch 14 and move the door from the closed to open position. A conventional key cylinder 20 is mounted on the door 12 just below the lift bar 18 and receives a key for locking and unlocking the door latch 14. When the door latch 14 is locked, the lift bar 18 can be lifted but is not effective to unlatch the door latch 14.

Figure 2:
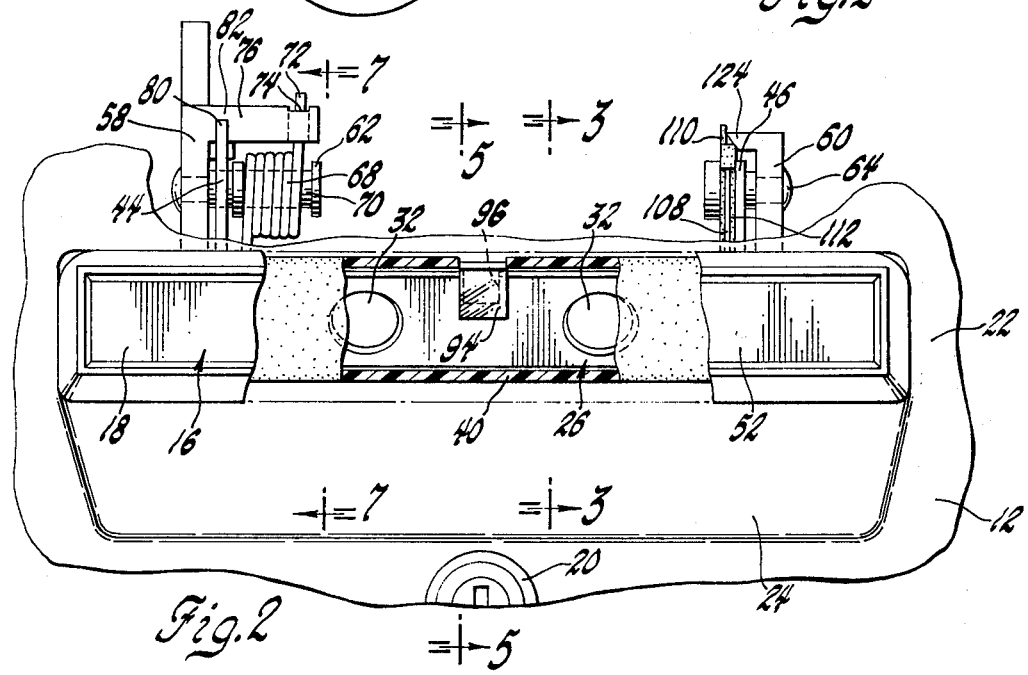
FIG. 2 is an enlarged view of FIG. 1 but having parts broken away in section.
Figure 3:
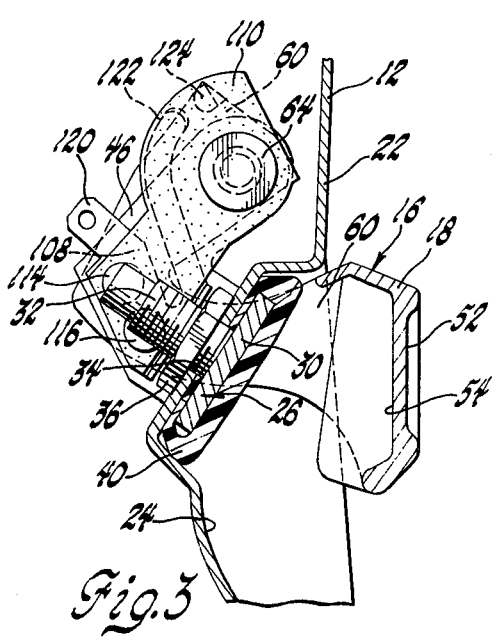
FIG. 3 is a sectional view taken in the direction of arrows 3—3 of FIG. 2.

Referring to FIGS. 2 and 3, it is seen that the door 12 has a door panel 22 with a recess 24 formed therein. The lift bar door handle assembly 16 includes a mounting bracket 26 which includes a base plate 30 having a pair of studs 32 engaged therein and extending through apertures 34 in the door panel 22. Nuts 36 are threadedly engaged on the studs 32. A plastic escutcheon 40 overlies and surrounds the base plate 30 to seal against entry of water. Mounting bracket 26 also has laterally spaced mounting arms 44 and 46 which extend through appropriately aligned apertures in the door panel 22.

Figure 4:
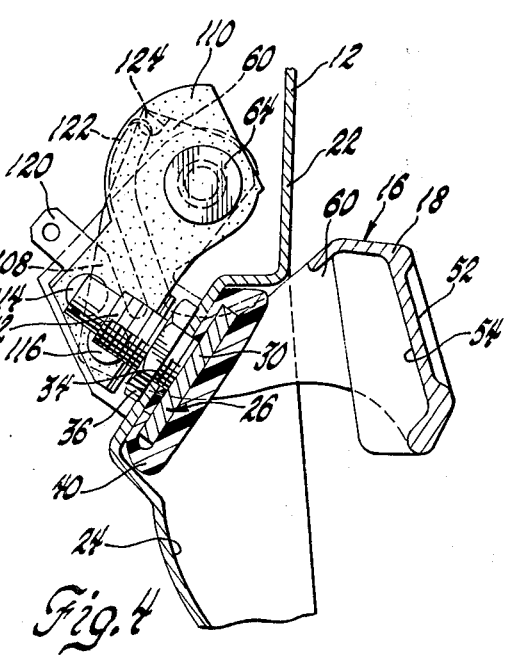
FIG. 4 is a view similar to FIG. 3 but showing the lift bar lifted to the door unlatching and light energizing position.

As best seen in FIGS. 2 and 3, the lift bar 18 has an outer surface 52 and an inner surface 54 which define a thin wall cross section of the lift bar. The lift bar is preferbly of die cast manufacture and has integral pivot arms 58 and 60 which are juxtaposed with the mounting arms 44 and 46 of the mounting bracket 26. A headed pivot shaft 62 extends from the pivot arm 58 and is pivotally received in an aperture of the mounting arm 44. A headed pivot shaft 64 extends from the pivot arm 60 and is pivotally received in an aperture of the mounting arm 46. Thus, the lift bar 18 is pivotally mounted for pivotal movement between the positions of FIGS. 3 and 4.

Figure 7:
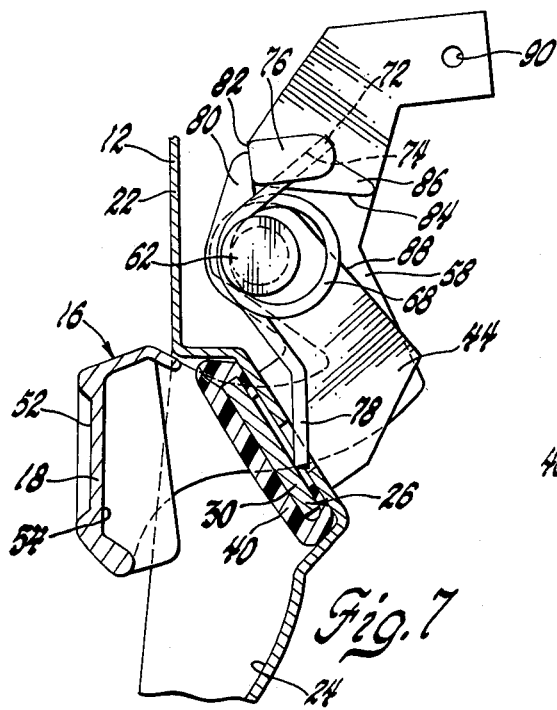
FIG. 7 is a sectional view taken in the direction of arrows 7—7 of FIG. 2.

As best seen in FIGS. 2 and 7, a torsion spring 68 has a plurality of coils which encircle an extension portion 70 of the pivot shaft 62. One end 72 of the torsion spring 68 is engaged in a recess 74 formed in a laterally extending portion 76 of the pivot arm 58. The other arm 78 of the torsion spring 68 is engaged against the mounting bracket base plate 30. The torsion spring 68 biases the lift bar 18 to its normal position shown in FIGS. 2, 3, 5 and 7. Referring to FIG. 7, this normal position is defined by engagement of a stop projectin 80 on the mountng arm 44 with an abutment surface 82 on the laterally extending portion 76 of the pivot arm 58. When the lift bar 18 is lifted and pivoted upwardly from its position of FIG. 7, a stop face 84 of an abutment 86 on the pivot arm 58 is carried into engagement with an edge face 88 of the mountng arm 44, thereby limiting pivotal movement of the lift bar 18. The pivot arm 58 has an aperature 90 at the end thereof which receives a rod, not shown, for operating the door latch 14 when the lift bar 18 is pivoted from its normal position of FIG. 7.

Figure 5:
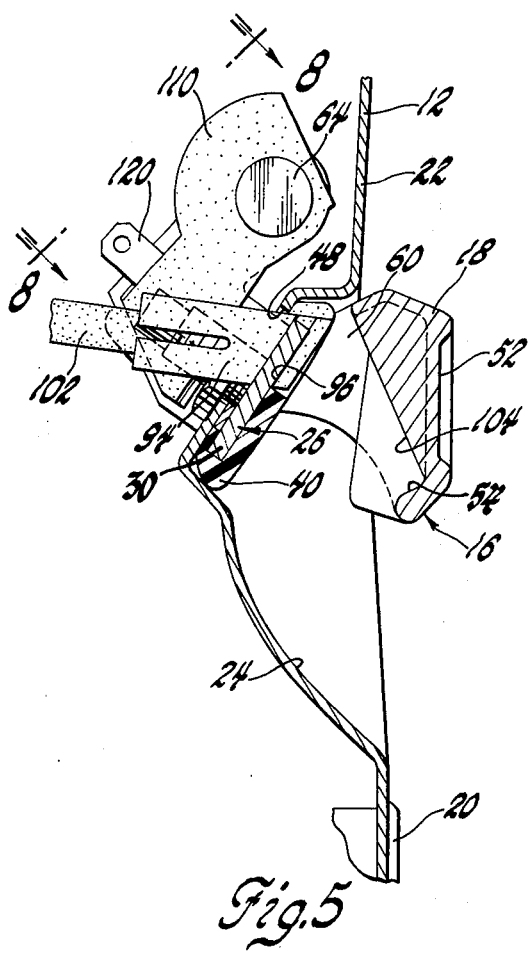
FIG.5 is a sectional view taken in the direction of arrows 5—5 of FIG. 2.
Figure 6:
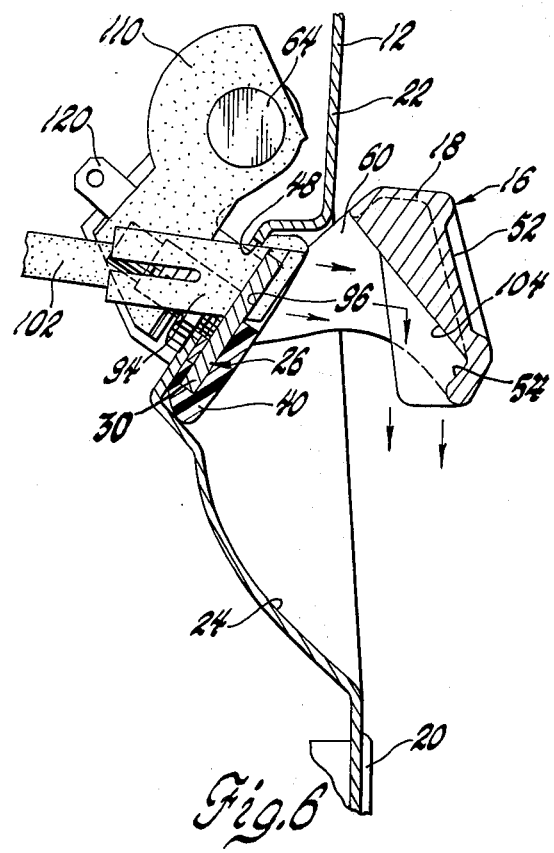
FIG. 6 is a view similar to FIG. 5 but showing the lift bar lifted to the door unlatching and light energizing position.

As best seen in FIG. 5, a lens 94 extends through an aperture 48 of door panel 22 and has a groove 96 extending along its side and bottom walls for engagement in a rectangular mounting opening provided in the mounting bracket base plate 30. A fiber optic bundle 102 is engaged in a bore of the lens 94 and has its other end communicating with a light bulb, not shown. Thus, when the light bulb is energized, the lens 94 transmits light onto the inner surface 54 of the lift bar 18. As best seen in FIG. 5, the lift bar 18 has an angled undersurface portion 104 which faces the lens 94. This angled undersurface 104 is preferably of about one or two inches in width so as to substantially intecept all of the illumination transmitted by the lens 94. As best seen by comparing FIGS. 5 and 6, the angular relationship of the angled undersurface 104 to the lens 94 varies as the lift bar 18 is lifted from its normal position of FIG. 5 to its door unlatching position of FIG. 6. When the lift bar is positioned as shown in FIG. 6, the light transmitted onto the angled surface undersurface 104 is directed downwardly to illuminate the key cylinder 20 to assist the insertion of the key into the key cylinder 20.

Figure 8:
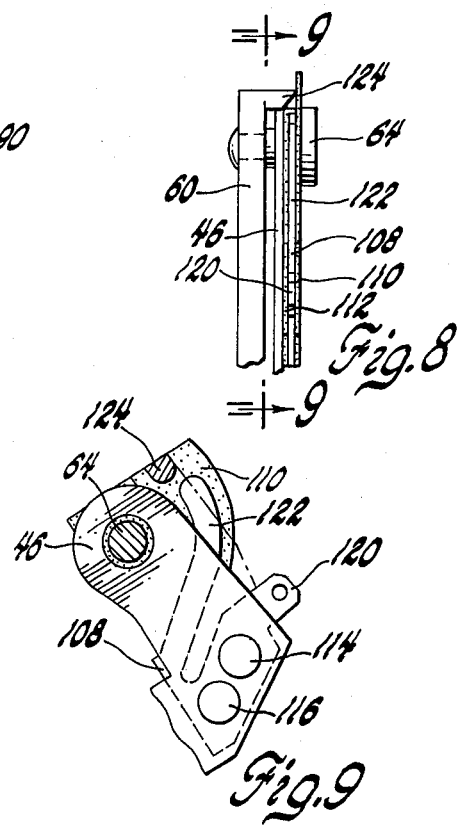
FIG. 8 is a view taken in the direction of arrows 8—8 of FIG. 5.
Figure 9:
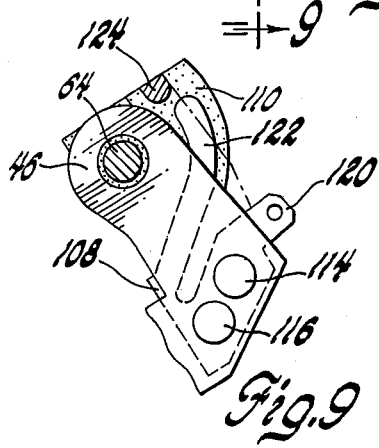
FIG. 9 is a sectional view taken in the direction of arrows 9—9 of FIG. 8.

As best seen in FIGS. 3, 8 and 9, a switch for energizing the light source is preferably incorporated into the lift bar door handle assembly 16. The switch includes a contact body 108 which is interleaved between fiber or plastic insulating panels 110 and 112. Rivets 114 and 116 attach the contact body 108 and insulating panels 110 and 112 to the mounting arm 46 of the mounting bracket 26. The rivets cooperate with the insulating panels 110 and 112 to electrically insulate the contact body 108 from the mounting arm 46. As best seen in FIGS. 3 and 9, the contact body 108 has a terminal 120 which is adapted to receive an electrical connector for connection to an electrical circuit for energizing the light source. The contact body 108 has a contact leaf 122 which is arcuately disposed about the pivot shaft 64. The pivot arm 60 has a projection 124 which extends laterally of the pivot arm 60.

As best seen in FIG. 3, the projection 124 of the pivot arm 60 is spaced somewhat from engagement with the contact leaf 122 when the lift bar 18 is in its normal position of FIG. 3. However, when the lift bar 18 is lifted to its position of FIG. 4, the pivot arm 60 carries the projection 124 into electrical contact with the contact leaf 122, thereby grounding the contact body 108 which in turn grounds the light source to effect its energization. Referring to FIG. 8, it will be understood that the contact leaf 122 and the insulating panel 110 will yield somewhat and are self-biased against the projection 124 so as to ensure electrical contact between the projection 124 and the contact leaf 122 when the lift bar is lifted.

Reference may be had to U.S. Pat. No. 3,908,149, Gergoe et al, patented Sept. 23, 1975 and assigned to the assignee of this invention, for a disclosure of an electrical circuit which may be employed in cooperation with the invention.

Thus, the invention provides and improved key illuminating door handle wherein a light source is located in protective concealment beneath a lift bar and a reflective undersurface on the lift bar reflects illumination onto the key cylinder when the door handle is lifted to the position for unlatching the door.

The embodiments of the invention in which an exclusive property or privilege is claimed are defined as follows:

1. In a vehicle door having a recess in the outer panel thereof, a door latch, a lift bar type door handle mounted on the door for movement between a first position overlying the recess and a second position outwardly of the recess to operate the door latch, and a key cylinder for operating a door lock, the improvement comprising: a light emitting means mounted on the vehicle door within the recess and covered by the handle when the handle is in the first position overlying the recess, reflective means on the undersurface of the handle for directing light from the light emitting means to the key cylinder when the handle is moved outwardly of the recess to the second position, and switch means operative upon movement of the handle to the second position for energizing the light emitting means.

2. In a vehicle door having a recess in the outer panel thereof, a door latch, a lift bar type door handle mounted on the door for movement between a first position overlying the recess and a second position away from the recess to operate the door latch, and a key cylinder for operating a door lock, the improvement comprising: a light emitting means mounted in generally flush relation with the vehicle door and within the recess thereof at a location out of line of sight of the key cylinder, the lift bar handle overlying the light emitting means when the handle is in the first position to conceal the light source from view and protect the light emitting means from damage, reflective means on the undersurface of the handle, said reflective means being disposed at an angular relation effective to reflect light from the light emitting means onto the key cylinder when the handle is moved outwardly of the recess to the second position, and switch means operative upon movement of the handle to the second position for energizing the emitting means.

3. In combination, a vehicle door having a longitudinally extending elongated recess in the outer panel thereof, a door latch for latching the door in a closed position, an elongated lift bar door handle pivotally mounted on the door about a longitudinal axis for upward lifting movement from a first position overlying the recess to a second position away from the recess to operate the door latch, a key cylinder mounted on the vehicle door at an elevation below the lift bar door handle and operable upon insertion of a properly bitted key to unlock the door latch, a light emitting means mounted on the vehicle door in generally flush relation therewith and within the recess of the door so as to be in protective concealment under the lift bar when the lift bar is in the first position overlying the recess, said lift bar having a reflective portion overlying the light emitting means and being angularly disposed so as to deflect light from the light emitting means onto the key cylinder when the lift bar is lifted upwardly of the recess to the second position, and switch means operative upon movement of the lift bar to the second position for energizing the light emitting means.

* * * * *